(12) United States Patent
Helfers et al.

(10) Patent No.: US 9,350,473 B2
(45) Date of Patent: May 24, 2016

(54) SATELLITE COMMUNICATION SYSTEM AND METHOD FOR TRANSMITTING DATA

(75) Inventors: Tim Helfers, Munich (DE); Chiok Leong, Stevenage (GB); David Robson, Appleby (GB)

(73) Assignee: Airbus Defence and Space Limited, Stevenage, Hertfordshire (GB)

( * ) Notice: Subject to any disclaimer, the term of this patent is extended or adjusted under 35 U.S.C. 154(b) by 661 days.

(21) Appl. No.: 13/638,415

(22) PCT Filed: Mar. 24, 2011

(86) PCT No.: PCT/EP2011/001460
§ 371 (c)(1),
(2), (4) Date: Jan. 10, 2013

(87) PCT Pub. No.: WO2011/120654
PCT Pub. Date: Oct. 6, 2011

(65) Prior Publication Data
US 2013/0102240 A1    Apr. 25, 2013

(30) Foreign Application Priority Data
Mar. 30, 2010    (EP) .................................... 10003401

(51) Int. Cl.
*H04H 40/90* (2008.01)
*H04B 7/185* (2006.01)

(52) U.S. Cl.
CPC ........... *H04H 40/90* (2013.01); *H04B 7/18513* (2013.01); *H04B 7/18515* (2013.01)

(58) Field of Classification Search
CPC ........................ H04B 7/18513; H04B 7/18515
See application file for complete search history.

(56) References Cited

U.S. PATENT DOCUMENTS

| 6,574,794 | B1 | 6/2003 | Sarraf | |
|---|---|---|---|---|
| 6,697,850 | B1 | 2/2004 | Saunders | |
| 7,111,316 | B1 * | 9/2006 | Zahorjan | H04N 7/17309 348/E7.07 |
| 8,634,296 | B2 * | 1/2014 | Agarwal | H04B 7/18515 370/230 |
| 8,787,246 | B2 * | 7/2014 | Brownrigg | H04B 7/18584 370/316 |

(Continued)

FOREIGN PATENT DOCUMENTS

| WO | WO 97/50250 A1 | 12/1997 |
|---|---|---|
| WO | WO 2004/003229 A2 | 8/2004 |

OTHER PUBLICATIONS

Li-Shen Juhn et al., "Harmonic Broadcasting for Video-on-Demand Service", IEEE Transactions on Broadcasting, Sep. 1, 1997, pp. 268-271, vol. 43, No. 3, XP011006079.

(Continued)

*Primary Examiner* — Bobbak Safaipour
(74) *Attorney, Agent, or Firm* — Crowell & Moring LLP

(57) ABSTRACT

A satellite communication system includes at least one base station, at least one satellite that can be brought into communication connection with the base station for data transmission, and a plurality of receivers adapted to receive signals transmitted from the satellite. The communication system is designed to transmit data in at least one uplink data stream from the base station to the satellite with a first data transmission rate and to transmit data in at least one downlink data stream from the satellite to the receivers with a second data transmission rate. The first data transmission rate is lower than the second data transmission rate and the satellite is provided with a data storage adapted to store the data transmitted from the base station to the satellite and to supply the data provided for the transmission to the receivers.

13 Claims, 1 Drawing Sheet

(56) References Cited

U.S. PATENT DOCUMENTS

| | | | |
|---|---|---|---|
| 2003/0033355 A1 | 2/2003 | Saunders et al. | |
| 2003/0181159 A1* | 9/2003 | Heinerscheid | H04H 20/51 455/3.02 |
| 2005/0249350 A1* | 11/2005 | Kahn | H04N 7/163 380/239 |
| 2005/0283815 A1* | 12/2005 | Brooks | H04H 20/78 725/126 |
| 2010/0274893 A1* | 10/2010 | Abdelal | H04L 29/0602 709/224 |
| 2011/0306293 A1* | 12/2011 | Miller | H04B 7/2041 455/12.1 |
| 2011/0312386 A1* | 12/2011 | White | G06Q 30/0267 455/566 |

OTHER PUBLICATIONS

Hari Om et al., Geometrico-Harmonic Broadcasting Scheme With Continuous Redundancy IEEE Transactions on Multimedia, Feb. 1, 2007, pp. 410-419, vol. 9, No. 2, XP011157480.

Hung-Chang Yang et al., A Live Harmonic Broadcasting Scheme for VBR-Encoded Hot Videos, Wired Wireless Internet Communications Lecture Notes in Computer Science, Jan. 1, 2006, pp. 236-246, XP019031635.

Boris Nikolaus, "Improving Efficiency and Enhancing Utilizability of Media-on-Demand Systems", Jul. 1, 2008.

Written Opinion (PCT/ISA/237) dated Sep. 26, 2011 (Twelve (12) pages).

International Search Report dated Sep. 26, 2011 with English language translation (Seven (7) pages).

European Search Report dated Jul. 4, 2014 (Seven (7) pages).

Paillassa B., et al., "Flexible satellites: software radio in the sky", Telecommunications, 2003. ICT 2003. 10$^{th}$ International Conference on Feb. 23- Mar. 1, 2003, Piscataway, NJ, USA, IEEE, vol. 2, Feb. 23, 2003, pp. 1596-1600, (Five (5) pages).

Morlet C., et al., "Towards generic satellite payloads: software radio", Parallel and Distributed Processing Symposium, 2003. Proceedings. International Apr. 22-26, 2003, Piscataway, NJ, USA, IEEE, Apr. 22, 2003, pp. 186-192, (Seven (7) pages).

Maral et al., "Satellite Communications Systems", Nov. 11, 2009, Wiley, XP002615604, ISBN:978-0-470-71458-4, vol. 5, pp. 225, 293-237, 361.

European Search Report dated Feb. 2, 2011, (Ten (10) pages).

European Search Report dated Jan. 25, 2011 (Five (5) pages).

\* cited by examiner

SATELLITE COMMUNICATION SYSTEM AND METHOD FOR TRANSMITTING DATA

The present invention is directed to a satellite communication system and to a method of transmitting data from at least one base station to a plurality of receivers via at least one satellite.

New entertainment technologies enable a user getting access to entertainment data, e.g. movies, computer games, music or e-books, on-demand not only via terrestrial communication systems but also via satellite communication systems.

BACKGROUND

FIG. 2 shows a prior art satellite communication system that allows the distribution of data from a data storage means provided in a base or ground station 101 via a satellite communication connection to an end-user community 103. The ground station 101 comprises a data storage means 110, e.g. a music or movie carrousel, as a data memory. A data manager 112 handles the requests sent from the respective user terminals 130 and ensures that the correct data are sent to the user terminal 130. A modulator means 114 is also part of the ground station 101. The modulator means 114 receives the data from the data storage means 110, modulates the data into a suitable data transmission format that is usually encrypted and sends these modulated data via a ground based satellite antenna 116 in an uplink data stream U' to a satellite 102.

The uplink data stream U' is received by a receiver 121 on-board of the satellite 102 through a first antenna 120 of the satellite 102 and is sent to a repeater means 122 on-board of the satellite 102. The repeater means 122 usually amplifies the received signals and sends them to a transmitter 123 connected to a second antenna 124 of the satellite 102 which transmits the amplified data as a downlink data stream D' to a plurality of user terminals 130. The addressed user terminal 130 usually decrypts the received data stream and processes the obtained signals in order to provide the user with the appropriate entertainment, e.g. a movie displayed on a video screen.

This known satellite communication system requires that the uplink data stream U' has the same data transmission rate as the downlink data stream D'. Consequently, the bandwidth for the uplink data stream U' must be the same as for the downlink data stream D'.

This known technology wastes communication bandwidth of the uplink path and prolongs the access time at least by the uplink signal travelling time. A video-on-demand application for about 200 HDTV movie channels would require a data transmission rate of 580 Mbps of uplink rate and downlink rate, respectively.

U.S. Pat. No. 6,697,850 B1 discloses a satellite-based communications system having an on-board internet web proxy cache. A request for a selected web page is transmitted from either a standard terminal or an enhanced terminal to the satellite. The satellite initially determines whether the transmission came from a standard user or an enhanced terminal. If the request was from a standard terminal, the satellite relays the request for the web page directly to the ground station, which retrieves the requested web page from a local cache or the internet, and transmits the requested web page to the satellite, where the satellite in turn retransmits it to the user terminal. If the original request was transmitted from an enhanced terminal, then the satellite determines whether or not it already has a copy of the requested web page in its on-board memory cache. If the satellite has a copy in its memory cache, the requested web page is retrieved from its memory cache and transmitted to the enhanced terminal. If the satellite does not have a copy of the requested web page, it requests the page from the ground station. This known system is directed to the internet where the satellite is provided only with a cache memory in which already transmitted pages are cached. As these cached pages do not cover all possible user requests, the uplink data connection must have the same data transmission rate as the downlink data connection, so that also non-cached pages can be quickly transmitted to the user.

DESCRIPTION OF THE INVENTION

Exemplary embodiments of the present invention are directed to economically providing a satellite communication system and a method of transmitting data from at least one base station to a plurality of receivers via at least one satellite which allow the transmission of high data volumes, in particular multi-media data, to the receivers.

The inventive satellite communication system of the present invention comprises at least one base station; at least one satellite which can be brought into communication connection with the base station for data transmission; and a plurality of receivers adapted to receive signals transmitted from the satellite. The communication system is designed to transmit data in at least one uplink data stream from the base station to the satellite with a first data transmission rate and to transmit data in at least one downlink data stream from the satellite to the receivers with a second data transmission rate. The first data transmission rate is lower than the second data transmission rate and the satellite is provided with a data storage means adapted to store the data transmitted from the base station to the satellite and to supply the data provided for the transmission to the receivers.

The provision of the data storage means on-board the satellite enables the provision of an uplink data connection between the base station and the satellite with a lower data transmission rate, which reduces the costs remarkably with respect to a communication system in which the uplink has the same data transmission rate as the downlink.

In accordance with exemplary embodiments of the present invention a storage capability is provided on-board of the satellite, i.e., at the last instance before the user itself, and not in the base station like it is the case in the prior art. The storage is dedicated for all data, which require repeating distribution.

In a preferred embodiment of the invention the bandwidth of the uplink data stream is lower than the bandwidth of the downlink data stream.

It is also advantageous if the data transmission protocol of the uplink data stream is different from the data transmission protocol of the downlink data stream. This allows serving a variety of different end user terminals and devices like stationary or mobile terminals.

Preferably the data storage means comprises flash memory chips. The use of flash technology enables storage of large data volumes in space and quick access to the data.

In a further preferred embodiment of the invention the satellite comprises at least one demodulator for demodulating the uplink data received from the base station and at least one modulator for modulating the data to be transmitted to the receivers and the data storage means is provided between the demodulator and the modulator. Thereby, the data can be stored in the satellite-based storage means in a demodulated state which allows data organisation, e.g., for repeating distribution, on-board the satellite.

Preferably the demodulator and/or the modulator are provided with a re-programmable processor. The use of re-programmable demodulation and/or modulation and also coding processing hardware enables the system to cope with different transmission protocols for the downlink to serve a variety of end user terminals. This includes the ability of the system to be updated in space with future new transmission protocol software.

An exemplary method in accordance with the present invention for transmitting data from at least one base station to a plurality of receivers via at least one satellite comprises the steps of a) transmitting data via at least one uplink data stream from the base station to the satellite with a first data transmission rate;

b) storing the data transmitted from the base station to the satellite in a data storage means on-board of the satellite; and c) transmitting data in at least one downlink data stream from the satellite to one or more receiver(s) with a second data transmission rate;

wherein the first data transmission rate is lower than the second data transmission rate.

Preferably the bandwidth of the uplink data stream is lower than the bandwidth of the downlink data stream.

The advantage of reduced bandwidth requirement on the uplink in the case of a single beam allows a single uplink gateway to serve many more downlink beams than is the case according to prior art.

This method allows to a data stock (e.g., like a carousel of movies or music) to be slowly uploaded to the satellite with a low capacity uplink, preferably having a small bandwidth, at reduced costs and to provide this data stock closer to the user in the storage means of the satellite from where it can be quickly transmitted to the end user terminals using the faster high capacity downlink, preferably having a larger bandwidth.

It is also advantageous to allow a multiplicity of beams of downlink data streams from the satellite to a multiplicity of groups of receivers or users, where each group is situated in a distinct beam served from the satellite.

In a preferred embodiment the satellite comprises means including on board encryption for the data content of the storage means to facilitate payment schemes for the on-demand content.

The effectiveness of the method can be enhanced if the data transmission protocol of the uplink data stream is different from the data transmission protocol of the downlink data stream. This allows using an efficient upload protocol on the uplink side and dispatching the data to terminals of different technologies, i.e., with a variety of different data distribution protocols, on the downlink side.

The method is very effective if the data received by the satellite are stored in at least one flash memory chip.

As already explained with respect to the satellite communication system, it is particularly advantageous if the data of the uplink data stream received by the satellite from the base station are demodulated in a demodulator on-board of the satellite before being stored in the storage means and if the data provided by the storage means for the downlink data stream are modulated in a modulator on-board of the satellite before being transmitted to the one or more receiver(s).

The method of the present invention is preferably used when the downlink data stream is a transmission on demand data stream like e.g., video-on-demand or music-on-demand or when it is a data push service, i.e., data are transmitted under control of the service provider.

Also part of a preferred embodiment of the method according to the invention are a variety of algorithms that allow efficient partition of sequentially viewed content (such as movies) to minimise the bandwidth consumed in the uplink data stream and/or downlink data stream while allowing a new viewer to start watching with a short delay. These algorithms may include harmonic broadcasting, amended harmonic broadcasting, fuzzy broadcasting etc. and these are well reviewed in 'Improving Efficiency and Enhanced Utilizability of Media-on-Demand Systems', a Dissertation by Boris Nikolaus, Dem Fachbereich 3-Mathematik/Informatik-der Universität Bremen, 2008 Jul. 1. These algorithms are well known and their use will enhance the performance of the system proposed here especially in trading quality and immediacy for mobile applications.

BRIEF DESCRIPTION OF THE DRAWINGS

A preferred embodiment of the invention is now described in detail with respect to the accompanying drawings in which.

DETAILED DESCRIPTION

Figure 1:
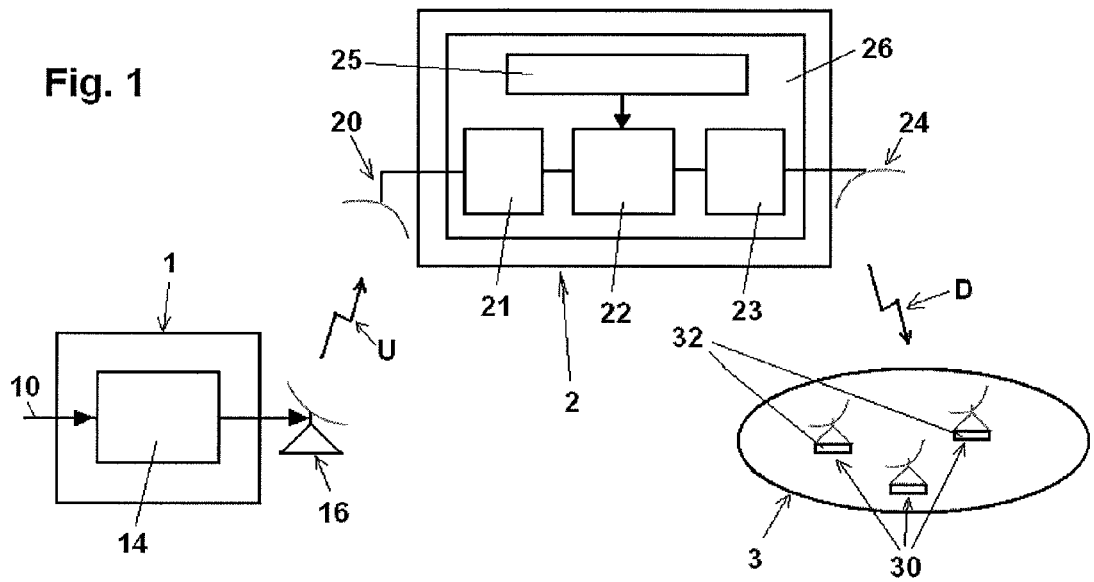
FIG. 1 shows a schematic depiction of one example of the satellite communication system according to the invention and FIG. 2 shows a diagram of a prior art satellite communication system.
Figure 2:
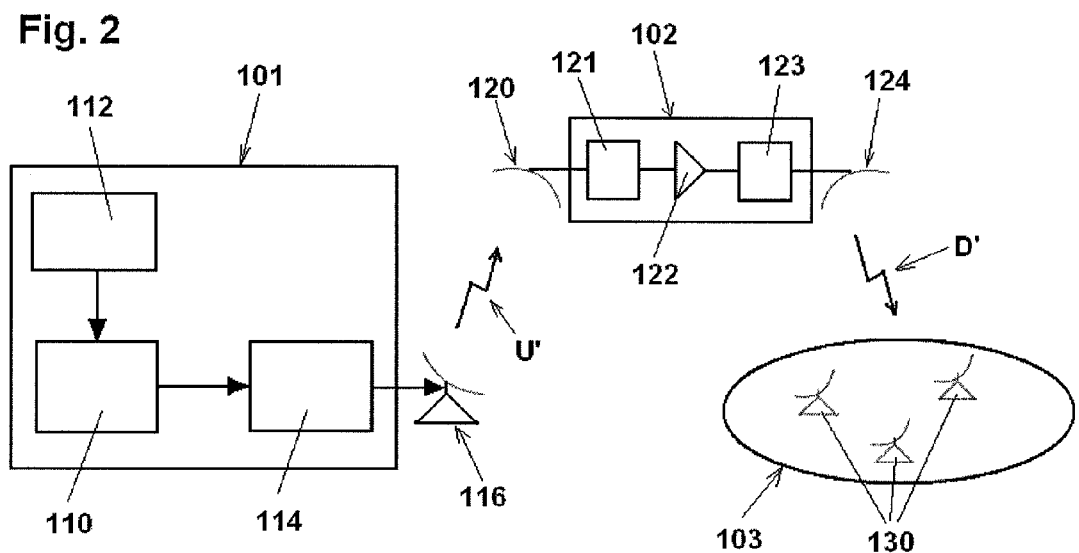

FIG. 1 shows a schematic diagram of a satellite communication system according to the invention. The system comprises a base station 1, a satellite 2 and an end user community 3 which are connected together via wireless data transmission passages U, D. The base station 1 is provided with a ground-based modulator and transmitter device 14 to which data are delivered from a data source (not shown) via a data input line 10. The modulated data are sent from the ground-based modulator and transmitter device 14 via a satellite antenna 16 in an uplink data stream U at a first data transmission rate to the satellite 2.

The satellite 2 is provided with a first antenna 20 that picks up the uplink data stream U. These data are guided from the first antenna 20 to a receiver and demodulator device 21 in which the modulated data stream is demodulated. The demodulated data are then transferred to a data storage device 22 where the data are stored in an on-board memory, e.g. in a flash memory hardware.

Upon a demand from a user terminal 30 of the user community 3 or from a service provider sent to the satellite 2, e.g., at an arbitrary point in time, a data management device 25 selects the requested data and controls the data storage means 22 so that the requested data are passed from the memory of the data storage means 22 to a modulator and transmitter device 23 where the data are modulated and converted to an appropriate downlink data transmission protocol. From there the modulated data are passed to a second antenna 24 of the satellite 2 and are transmitted in a downlink data stream D to a receiver 32 of the designated user terminal or terminals 30. The modulated downlink data stream D is demodulated in the addressed user terminal(s) 30 and the obtained signals are used to provide the respective user with the requested information, e.g., a movie, music, an e-book, a computer game or other entertainment or other application.

The satellite-based receiver and demodulator device 21, the storage means 22, the modulator and transmitter device 23 and the data management device 25 commonly define a store and stream unit 26, which is the satellite-side core element of the present example of the communication system. The demodulator in the receiver and demodulator device 21 and also the modulator in the modulator and transmitter device 23 of the satellite-based store and stream unit 26 are designed as re-programmable devices.

The data transmission rate of the uplink data stream U is remarkably lower than the data transmission rate of the downlink data stream D. Due to the provision of the storage means 22 on-board the satellite 2 the downlink data stream D is independent from the uplink data stream U. Consequently, the requirements to the uplink data transmission rate are relatively low compared to the downlink data transmission rate. For example, for a movie carousel of a video-on-demand application the downlink rate for 200 HDTV films is about 580 Mbps. The uplink rate requirement of the carousel at an update rate of every 4 weeks is only 6 Mbps, which reduces the uplink bandwidth requirement of the satellite at a factor of 100.

With the on-board re-modulation and in particular with the re-programmable modulator different downlink transmission protocols can be generated, independent from the satellite uplink transmission protocol. This is an advantage, as the uplink is defined by the link between one or more big ground station(s) and the satellite and the downlink is defined by the link between the satellite and a high number of small user devices and, therefore the same protocol is not beneficial for both communication paths.

In a preferred embodiment the satellite comprises means including on board encryption for the data content of the storage means to facilitate payment schemes for the on-demand content.

Practical examples for repeating data broadcasting with the inventive system and according to the inventive method are:

Video-on-demand using a movie carousel and continuous harmonic broadcasting wherein a set of movies can be viewed at any time with a certain playback start delay;

Other multimedia data-on-demand with the same principle like e.g. e-books, games, music etc;

Software or configuration updates for mobile devices, for example in cars etc., which are sometimes not available due to switch-off times or shadowing (example: navigation devices);

Game status information of endless games with millions of players;

Data within satellite constellation networks (example: storage of data until visibility of the satellite; re-transmission of data in case of re-established link);

Multimedia data for end-users, stored on-board a non-GEO-stationary satellite, to be broadcasted at different locations of the earth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Reference numerals in the claims, in the description and in the drawings are provided only for a better understanding of the invention and shall not delimit the scope of protection which is defined by the wording and meaning of the claims.

LISTING OF REFERENCE NUMERALS

1 base station
2 satellite
3 end user community
10 data input line
14 ground-based modulator and transmitter device
16 satellite antenna
20 first antenna
21 receiver and demodulator device
22 storage means
23 modulator and transmitter device
24 second antenna
25 data management device
26 store and stream unit
30 user terminals
32 receivers
101 ground station
102 satellite
103 end user community
110 data storage means
112 data manager
114 modulator means
116 satellite antenna
120 first antenna
121 receiver
122 repeater means
123 transmitter
124 second antenna
130 user terminals
D, D' downlink data stream
U, U' uplink data stream

The invention claimed is:

1. A satellite communication system comprising:
a base station;
a satellite communicatively connected with the base station for data transmission; and
a plurality of receivers configured to receive signals transmitted from the satellite,
wherein the satellite is provided with a data storage device configured to store the data transmitted from the base station to the satellite and to supply the data provided for the transmission to the plurality of receivers,
wherein the satellite communication system is configured to:
transmit data of a given data stock in at least one uplink data stream from the base station to the satellite with a first data transmission rate, and
transmit corresponding data of said given data stock in at least one downlink data stream from the satellite to the plurality of receivers with a second data transmission rate, said at least one downlink data stream being an on demand data stream, the demand being on either or both of a transmit side or a receive side,
wherein a bandwidth of the uplink data stream is different from a bandwidth of the downlink data stream, the first data transmission rate is lower than the second data transmission rate, and a data transmission protocol of the uplink data stream is different from a data transmission protocol of the downlink data stream, and
wherein the satellite communication system includes a modulator that is provided with a reprogrammable processor so that different downlink transmission protocols can be generated, independent from the satellite uplink transmission protocol.

2. The satellite communication system according to claim 1, wherein the bandwidth of the uplink data stream is lower than the bandwidth of the downlink data stream.

3. The satellite communication system according to claim 1,
wherein the satellite comprises: a multiplicity of beams, wherein the satellite is configured to transmit downlink data streams to a multiplicity of groups of receivers over the multiplicity of beams, and wherein each group of the multiplicity of groups of receivers is situated in a distinct beam served from the satellite.

4. The satellite communication system according to claim 1, wherein the data storage device comprises flash memory chips.

5. The satellite communication system according to claim 1, wherein the satellite comprises: a demodulator configured to demodulate the uplink data received from the base station; and a modulator configured to modulate the data to be transmitted to the receivers, and wherein the data storage is arranged between the demodulator and the modulator.

6. The satellite communication system according to claim 5, wherein the demodulator or the modulator includes a reprogrammable processor.

7. The satellite communication system according to claim 1, wherein the satellite comprises: an encryption device configured to encrypt the data content of the storage device to facilitate payment schemes for on-demand content.

8. A method of transmitting data from a base station to a plurality of receivers via a satellite, the method comprising the steps of:

transmitting data of a given data stock via at least one uplink data stream from the base station to the satellite with a first data transmission rate;

storing the data transmitted from the base station to the satellite in a data storage device on-board the satellite;

transmitting corresponding data of said data stock in at least one downlink data stream from the satellite to one or more receivers with a second data transmission rate, wherein the downlink data stream is a transmission on demand data stream, the demand being on either or both of a transmit side or a receive side, a bandwidth of the uplink data stream is different than a bandwidth of the downlink data stream, the first data transmission rate is lower than the second data transmission rate, and a data transmission protocol of the uplink data stream is different from a data transmission protocol of the downlink data stream.

9. The method according to claim 8, wherein the bandwidth of the uplink data stream is lower than the bandwidth of the downlink data stream.

10. The method according to claim 8, wherein the data received by the satellite are stored in at least one flash memory chip of the storage device.

11. The method according to claim 8, further comprising: demodulating, by a demodulator on-board of the satellite, the data of the uplink data stream received from the base station before being stored in the storage device; and modulating, by a modulator on-board of the satellite, the data stored in the storage device for the downlink data stream before being transmitted to the one or more receivers.

12. The method according to claim 8, wherein at least one algorithm that allows efficient partition of sequentially viewed content is employed for compression of the uplink data stream or the downlink data stream to minimize bandwidth consumed while allowing a new viewer to start watching with a short delay, wherein said at least one algorithm includes harmonic broadcasting, amended harmonic broadcasting or fuzzy broadcasting.

13. A satellite communication system comprising:

a base station;

a satellite communicatively connected with the base station for data transmission; and a plurality of receivers configured to receive signals transmitted from the satellite, wherein the satellite is provided with a data storage device configured to store the data transmitted from the base station to the satellite and to supply the data provided for the transmission to the plurality of receivers, wherein the satellite communication system is configured to:

transmit data of a given data stock in at least one uplink data stream from the base station to the satellite, and transmit corresponding data of said given data stock in at least one downlink data stream from the satellite to the plurality of receivers, said at least one downlink data stream being an on demand data stream, the demand being on either or both of a transmit side or a receive side, and wherein a bandwidth of the uplink data stream is different from a bandwidth of the downlink data stream.

* * * * *